United States Patent
Dickel

(10) Patent No.: US 11,802,603 B2
(45) Date of Patent: Oct. 31, 2023

(54) HIGH THERMAL CONDUCTIVITY HEAT SHIELD

(71) Applicant: GOODRICH CORPORATION, Charlotte, NC (US)

(72) Inventor: Jacob Allen Dickel, South Charleston, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 490 days.

(21) Appl. No.: 16/896,859

(22) Filed: Jun. 9, 2020

(65) Prior Publication Data

US 2021/0381567 A1 Dec. 9, 2021

(51) Int. Cl.
| | | |
|---|---|---|
| F16D 65/847 | (2006.01) | |
| B64C 25/36 | (2006.01) | |
| B64C 25/42 | (2006.01) | |
| B64C 25/44 | (2006.01) | |
| B60B 3/00 | (2006.01) | |

(Continued)

(52) U.S. Cl.
CPC ........... *F16D 65/847* (2013.01); *B64C 25/36* (2013.01); *B64C 25/42* (2013.01); *B64C 25/44* (2013.01); *B60B 3/00* (2013.01); *B60B 21/00* (2013.01); *B60B 2360/102* (2013.01); *B60B 2360/104* (2013.01); *B60B 2360/141* (2013.01); *B60B 2900/212* (2013.01); *B60B 2900/513* (2013.01); *F16D 2065/785* (2013.01); *F16D 2200/003* (2013.01); *F16D 2200/0021* (2013.01)

(58) Field of Classification Search
CPC ......... B64C 25/36; B64C 25/42; B64C 25/44; F16D 65/847; F16D 2065/785; F16D 2200/0021; F16D 2200/003; B60B 21/00; B60B 2360/102; B60B 2360/104; B60B 2360/141; B60B 2900/212; B60B 2900/513

See application file for complete search history.

(56) References Cited

U.S. PATENT DOCUMENTS

| | | | | |
|---|---|---|---|---|
| 4,017,123 A | * | 4/1977 | Horner | B60C 23/18 188/264 G |
| 6,207,299 B1 | * | 3/2001 | Krauth | C23C 2/12 428/653 |

(Continued)

FOREIGN PATENT DOCUMENTS

| | | |
|---|---|---|
| EP | 3159571 | 4/2017 |
| EP | 3521161 | 8/2019 |
| EP | 3647622 | 5/2020 |

OTHER PUBLICATIONS

European Patent Office, European Search Report dated Oct. 29, 2021 in Application No. 21178024.2.

*Primary Examiner* — Kip T Kotter
(74) *Attorney, Agent, or Firm* — SNELL & WILMER L.L.P.

(57) ABSTRACT

A heat shield for an aircraft wheel assembly is made of a heat shield material evenly distributed across the heat shield along both the circumferential and the axial directions. The heat shield material has a high thermal conductivity greater than 30 W/mK. In various embodiments, the thermal conductivity is greater than 85 W/mK. In this manner, thermal flux is maximized throughout the heat shield to distribute heat evenly across the heat shield in both circumferential and axial directions.

13 Claims, 4 Drawing Sheets

(51) Int. Cl.
    *B60B 21/00*    (2006.01)
    *F16D 65/78*    (2006.01)

(56) References Cited

U.S. PATENT DOCUMENTS

| | | | |
|---|---|---|---|
| 7,972,708 B2* | 7/2011 | Schweiggart | F01N 13/14 |
| | | | 428/603 |
| 10,519,845 B2* | 12/2019 | Zhang | B32B 7/00 |
| 2007/0034462 A1 | 2/2007 | Themelin et al. | |
| 2008/0121475 A1 | 5/2008 | Bhaskara | |
| 2018/0216684 A1 | 8/2018 | Gruss et al. | |
| 2019/0241257 A1* | 8/2019 | Leiva | B32B 37/14 |
| 2019/0344880 A1 | 11/2019 | Ngatu et al. | |
| 2020/0130818 A1 | 4/2020 | Leiva | |
| 2020/0189727 A1* | 6/2020 | French | F16D 65/0081 |

\* cited by examiner

HIGH THERMAL CONDUCTIVITY HEAT SHIELD

FIELD

The present disclosure relates generally to wheel and brake assemblies and, more particularly, to heat shields for aircraft wheel and brake assemblies.

BACKGROUND

Aircraft typically utilize brake systems on wheels to slow or stop the aircraft during landings, taxiing and rejected takeoffs. The brake systems generally employ a brake stack comprising a series of friction disks that may be forced into sliding contact with one another during brake actuation to slow or stop the aircraft. Under various conditions, brake actuation may generate high temperatures in the vicinity of the brake stack that can adversely impact or damage wheels or tires mounted thereon. Dissipation of this heat energy is desired to reduce or eliminate the deteriorative effects on the wheel and tire structure which, in certain instances such as an aborted or rejected take-off, can result in high temperatures that may result in tire ruptures or fires. A heat shield positioned between the brake stack and the wheel can mitigate thermal damage.

SUMMARY

A wheel assembly is disclosed, comprising a wheel having a rim and configured to rotate about an axis, a torque bar disposed radially inward of the rim, a heat shield disposed between the wheel and the torque bar, wherein the heat shield comprises a cylindrical structure extending circumferentially about an axis of the wheel and around an inner diameter of the rim, and the heat shield comprises a heat shield material, and a thermal conductivity of the heat shield material is greater than 30 W/mK.

In various embodiments, the thermal conductivity of the heat shield material is greater than 70 W/mK.

In various embodiments, the thermal conductivity of the heat shield material is greater than 85 W/mK.

In various embodiments, the thermal conductivity of the heat shield material is greater than 160 W/mK.

In various embodiments, the wheel assembly further comprises a heat shield retainer comprising a retainer material, wherein a thermal conductivity of the retainer material is greater than 30 W/mK.

In various embodiments, the wheel assembly further comprises a chin ring comprising a chin ring material, wherein a thermal conductivity of the chin ring material is greater than 30 W/mK.

In various embodiments, the heat shield material is evenly distributed throughout the heat shield.

In various embodiments, the heat shield comprises a first end and a second end spaced apart from the second end, wherein the first end of the heat shield includes a first hook member and the second end of the heat shield includes a second hook member.

In various embodiments, the heat shield retainer includes a first clip member configured to engage the first hook member and a second clip member configured to engage the second hook member.

In various embodiments, the cylindrical structure comprises a metal layer comprising a steel core and an aluminum coating covering the steel core.

In various embodiments, the wheel assembly further comprises a brake stack disposed within the heat shield.

A heat shield for an aircraft wheel assembly is disclosed, comprising an outer layer, and an inner layer spaced apart from the outer layer, wherein at least one of the outer layer and the inner layer comprises a heat shield material evenly distributed across the heat shield, wherein a thermal conductivity of the heat shield material is greater than 30 W/mK.

In various embodiments, the thermal conductivity of the heat shield material is greater than 70 W/mK.

In various embodiments, the thermal conductivity of the heat shield material is greater than 85 W/mK.

In various embodiments, the thermal conductivity of the heat shield material is greater than 160 W/mK.

In various embodiments, the heat shield further comprises a middle layer disposed between the outer layer and the inner layer, wherein the middle layer is made from at least one of an aluminum or an aluminum alloy.

In various embodiments, the heat shield further comprises a dimpled foil layer disposed between the middle layer and the inner layer.

In various embodiments, the heat shield further comprises an insulating core material disposed between the inner layer and the outer layer.

A heat shield for an aircraft wheel assembly is disclosed, comprising a metal layer comprising a steel core and an aluminum coating covering the steel core.

In various embodiments, the heat shield comprises a thermal conductivity greater than 85 W/mK.

In various embodiments, the heat shield comprises a cylindrical geometry.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

Figure 1A:
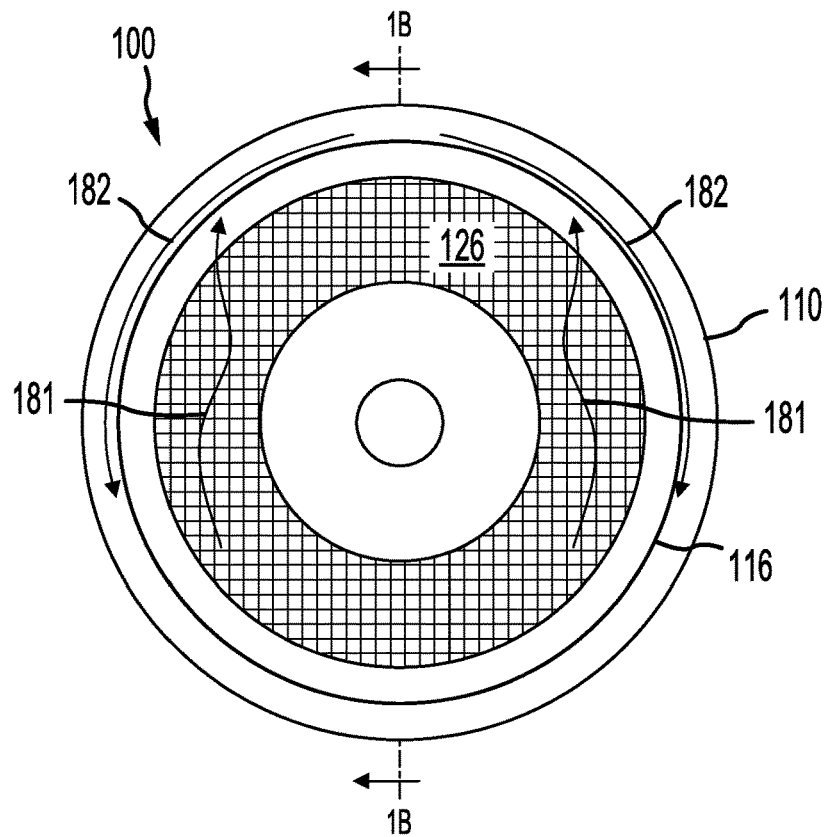
FIG. 1A illustrates a schematic view of a wheel/brake assembly, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Typically, heat shields for aircraft wheel assemblies comprise thermally insulating materials (i.e., comprising relatively low thermal conductivities) to reduce thermal flux between the brake stack (heat sink) and the wheel assembly. In contrast to the present direction of the field of art, the present disclosure provides a heat shield made from a high thermal conductivity material, such as aluminized steel, aluminum, or an aluminum alloy, among other materials. After a braking maneuver, a large thermal gradient may be present in a wheel/brake assembly. At rest, the top of the wheel/brake assembly may be hottest due to natural convection, while the bottom of the wheel/brake assembly may be coolest. Furthermore, the inboard side of the wheel/brake assembly may be cooler than an outboard side of the wheel/brake assembly near the webbing of the wheel. By increasing the thermal conductivity of the heat shield, heat flux through the heat shield from hot areas to cooler areas along the circumferential direction may be increased or otherwise enhanced. Furthermore, heat flux through the heat shield from hot areas to cooler areas along the axial direction may be increased or otherwise enhanced. Because the thermal conductivity of air is far less than that of the high thermal conductivity heat shield material, conductive heat transfer through the heat shield may be the dominant mode of heat transfer. As heat is transferred from the upper region to the lower region of the heat shield, the radial thermal gradient (i.e., the thermal gradient along the radial direction) becomes greater resulting in greater heat transfer in the bottom region and faster cooling times. Likewise, as heat is transferred from the outboard region to the inboard region of the heat shield, the radial thermal gradient (i.e., the thermal gradient along the radial direction) becomes greater resulting in greater heat transfer in the inboard region and faster cooling times.

In various embodiments, heat shields comprise one or more segments connected together at their ends by retainers. In this manner, retainers may similarly be made from a high thermal conductivity material. In various embodiments, the heat shield and the heat shield retainer comprises the same high thermal conductivity material.

In various embodiments of braking systems, the heat sink is of greater axial dimension than the wheel rim member into which the heat sink extends. In such a braking system, a chin ring may be attached to an aircraft wheel to prevent an aircraft tire from being heated by radiant energy emitted from the heat sink (tire being in the "line of sight" of the heat sink components). The present disclosure provides a chin ring comprising a high thermal conductivity material to maximize thermal flux from the heat shield to the chin ring which is generally located at an inboard side of the wheel with better exposure to ambient conditions to aid in shedding heat externally from the wheel.

Figure 1B:
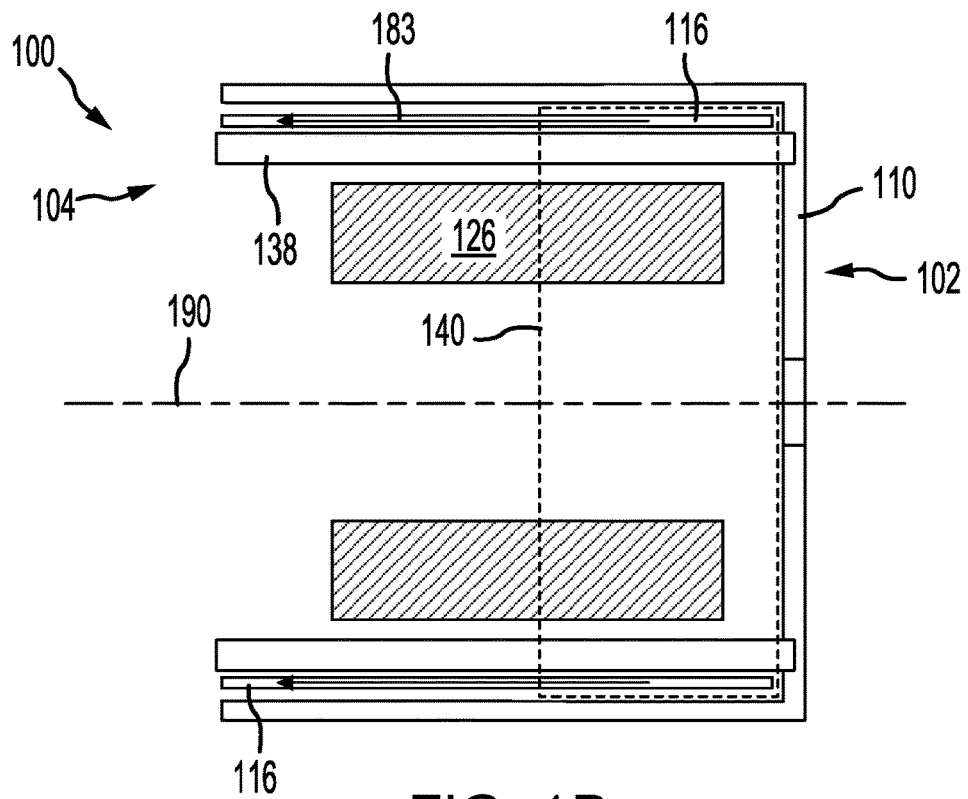
FIG. 1B illustrates a cross-sectional view of the wheel/brake assembly of FIG. 1A, in accordance with various embodiments.

With combined reference to FIG. 1A and FIG. 1B, a schematic view of a wheel assembly 100 is illustrated, in accordance with various embodiments. Wheel assembly 100 generally comprises a wheel 110, a heat shield 116, and a brake stack 126. A central axis 190 extends through the wheel 110 and defines an axis of rotation of the wheel 110. The brake stack 126 generally comprises a plurality of rotor disks interleaved with a plurality of stator disks positioned intermediate a pressure plate and an end plate. The plurality of rotor disks and the plurality of stator disks are fabricated from various materials, such as ceramic matrix composites, that enable the brake disks to withstand and dissipate the heat generated during and following a braking action.

The heat shield 116 is secured directly or indirectly (e.g., via one or more torque bars and/or via a chin ring, among other indirect connections) to the wheel 110 between a radially inward surface of the wheel 110 and the brake stack 126. In various embodiments, the heat shield 116 is secured directly or indirectly to the wheel 110 between a radially inward surface of the wheel 110 and a plurality of torque bars 138. Heat shield 116 may be concentric with the wheel 110.

Figure 4:
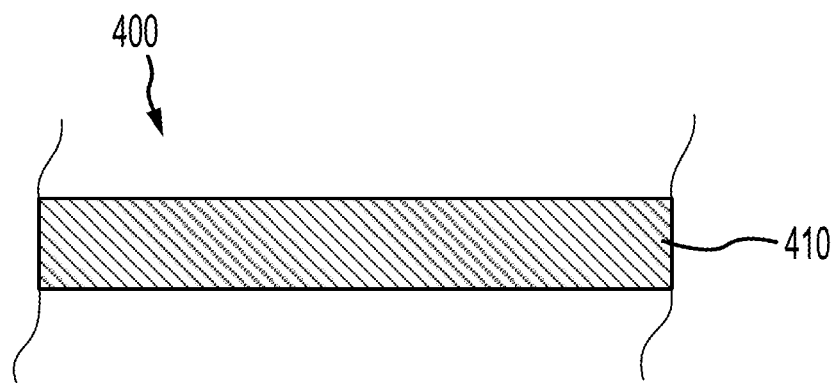
FIG. 4 illustrates a section view of a heat shield comprising a high thermal conductivity material, in accordance with various embodiments.
Figure 5:
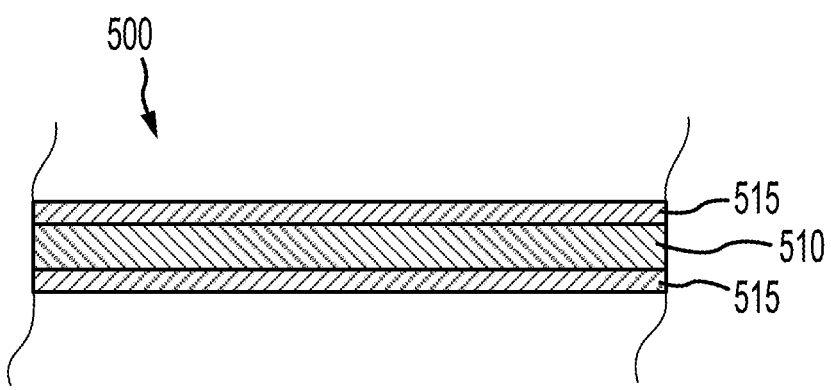
FIG. 5 illustrates a section view of a heat shield comprising a high thermal conductivity material and a steel core, in accordance with various embodiments.

Heat shield 116 may be made from a material comprising a high thermal conductivity. Heat shield 116 may be comprised of a material, such as a metal or metal alloy, comprising a thermal conductivity that is greater than 30 Watts per meter Kelvin (W/mK) (17.34 BTU/(h ft ° F.)), in accordance with various embodiments, greater than 70 W/mK (40.47 BTU/(h ft ° F.)), in accordance with various embodiments, greater than 85 W/mK (49 BTU/(h ft ° F.)), in accordance with various embodiments, and/or greater than 160 W/mK (92.5 BTU/(h ft ° F.)), in accordance with various embodiments. In this regard, with momentary reference to FIG. 4, heat shield 116 may comprise a metal 400 comprising a high thermal conductivity material 410 evenly distributed throughout heat shield 116. Stated differently, the entire heat shield 116 comprises the high thermal conductivity material 410. In various embodiments, heat shield 116 may be made from aluminized steel. Aluminized steel may comprise a thermal conductivity of between 85 and 95 W/mK (between 49 and 55 BTU/(h ft ° F.)), in accordance with various embodiments. The high thermal conductivity material may comprise an aluminum alloy coating evenly distributed across the entire heat shield 116. In this regard, with momentary reference to FIG. 5, heat shield 116 may comprise an aluminized steel sheet 500 comprising a steel core 510 and an aluminum coating 515 covering the steel core 510. In various embodiments, aluminum coating 515 may be evenly distributed throughout the surface of aluminized steel sheet 500. For example, steel core 510 may be hot-dip coated in the aluminum coating 515. Steel core 510 may comprise a carbon steel or a stainless steel, among other types of iron alloys, in accordance with various embodiments. Aluminum coating 515 may comprise an aluminum, or an aluminum alloy, such as an aluminum-silicon alloy, or an aluminum-zinc alloy, among other types of aluminum alloys. In various embodiments, heat shield 116 may be made from aluminum. Aluminum may comprise a thermal conductivity of between 160 and 240 W/mK (between 92.5 and 138.7 BTU/(h ft ° F.)), in accordance with various embodiments. In various embodiments, heat shield 116 may be made from copper. Copper may comprise a thermal conductivity of between 370 and 410 W/mK (between 214 and 237 BTU/(h ft ° F.)), in accordance with various embodiments. However, heat shield 116 may be made from various metals or metal alloys comprising a high thermal conductivity, as described herein. As used herein, the thermal conductivity provided for various materials may be the thermal conductivity of the material at room temperature. In various embodiments, the heat shield material comprises a melting temperature of no less than 1100° F. (593° C.) so as to withstand heat generated by the brake stack.

In various embodiments, the heat shield material comprising the high thermal conductivity is evenly distributed throughout the heat shield 116. Stated differently, the entire heat shield 116 may comprise the high thermal conductivity heat shield material. In this manner, heat flux from areas of higher temperatures to areas of lower temperatures of the heat shield 116 is facilitated and/or maximized in both circumferential and axial directions.

During a braking maneuver heat is generated by brake stack 126. This heat (i.e., radiant heat and/or convection heat) may travel upwards, as illustrated by arrows 181 in FIG. 1A. Heat shield 116 may absorb this heat to reduce the temperature of wheel 110. Due to the high thermal conductivity of heat shield 116, heat is more easily conducted through heat shield 116 to evenly distribute heat around the entire circumference of heat shield 116. In various embodiments, heat 181 that radiates or convectively travels upwards within wheel 110 may be conductively transferred downwards through heat shield 116, as represented by arrows 182. In this manner, the high thermal conductivity of heat shield 116 drives conductive heat transfer through heat shield 116 to be a dominant form of heat transfer to minimize radiant or convective heat transfer from brake stack 126 and/or heat shield 116 to wheel 110.

Furthermore, with reference to FIG. 1B, heat generated by brake stack 126 may tend to accumulate within wheel 110 towards the outboard side 102 of wheel 110 in the general region circumscribed by dashed line 140. In addition to circumferential distribution of heat, heat shield 116 may further evenly distribute heat along the axial direction to draw heat from within wheel 110 (i.e., the region generally within dashed line 140) towards an inboard side 104 of wheel 110, as illustrated by arrow 183, which may be better exposed to ambient conditions to remove heat from within wheel 110. Furthermore, heat may be transferred conductively to other components such as a chin ring (e.g., see chin ring (e.g., see chin ring 220 of FIG. 2), or a retainer (e.g., see retainer 304 of FIG. 2), in accordance with various embodiments. In this regard, chin ring 220 and/or retainer 304 may similarly be made from a high thermal conductivity material, as provided herein.

Figure 2:
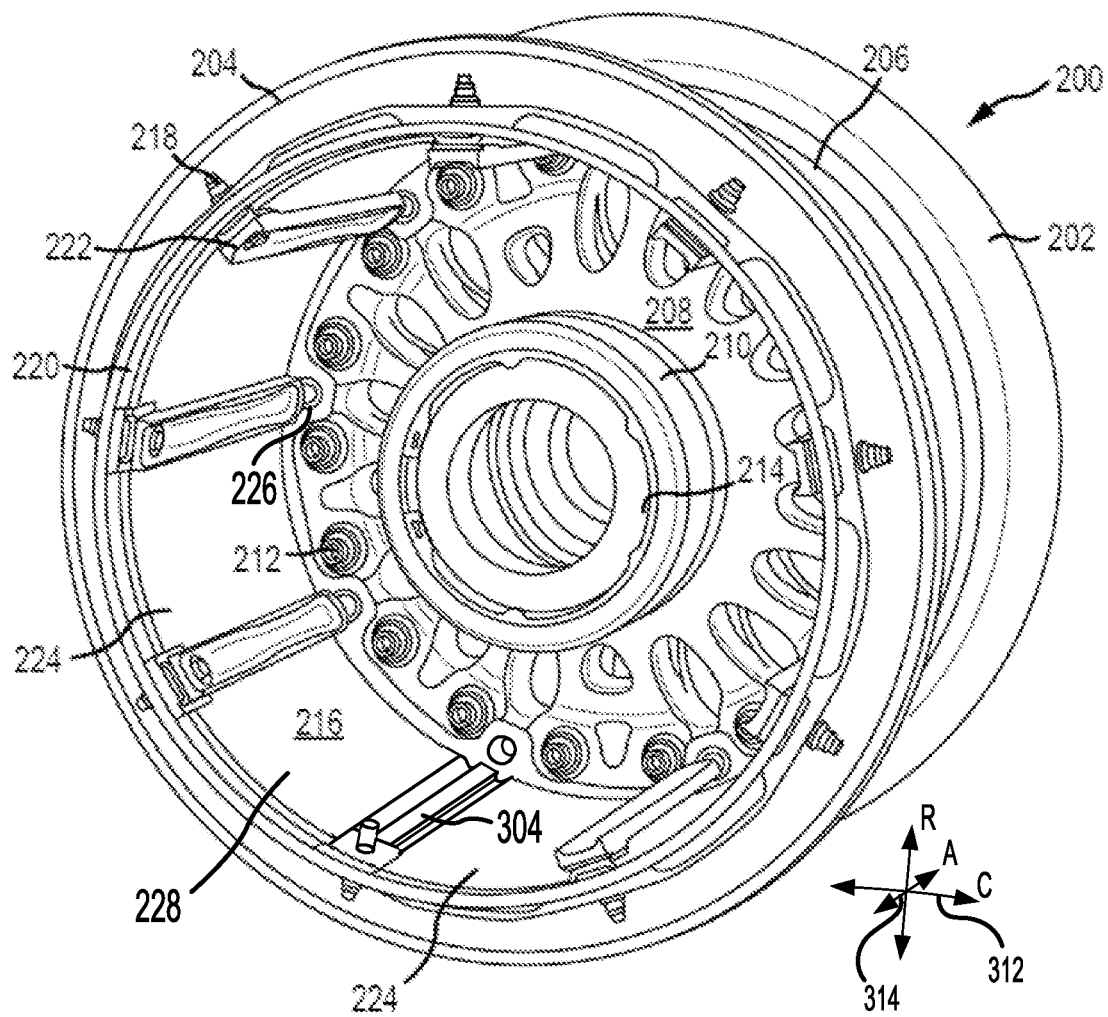
FIG. 2 illustrates a wheel assembly comprising a wheel, a heat shield, a retainer, and a chin ring, in accordance with various embodiments.

Referring now to FIG. 2, a wheel 200 having a heat shield is provided. In various embodiments, the wheel 200 includes an outboard lip 202, coupled to a wheel disk 208 by a plurality of wheel tie bolts 212, and an inboard lip 204 defining a rim 206 about the wheel disk 208. A hub 210 is centered through the wheel disk 208 and may comprise one or more bearings 214. The rim 206 extends axially with respect to the hub 210 about a circumference of the wheel disk 208. A heat shield 216 is disposed radially inward of the rim 206 between the inboard lip 204 and the wheel disk 208 of the wheel 200. Heat shield 216 may be similar to heat shield 116 of FIG. 1A and FIG. 1B. In various embodiments, the heat shield 216 includes a cylindrical structure 228 extending circumferentially about an axis of the hub 210 and around an inner diameter of the rim 206. In various embodiments, the heat shield 216 may be coupled proximate the rim 206 by a plurality of fasteners 218 and may be held proximate the rim 206, with a chin ring 220 proximate the inboard lip 204, by an interference between the heat shield 216 and a plurality of torque bars 222, in accordance with various embodiments. In various embodiments, the plurality of torque bars 222 may be coupled to the wheel disk 208 at an outboard end and may be coupled to the heat shield 216 at an inboard end proximate the chin ring 220 by the plurality of fasteners 218. The plurality of torque bars 222 may extend into torque bar apertures 226 disposed in wheel disk 208. As described below, in various embodiments, the heat shield 216 may comprise one or more heat shield segments 224 that are arranged and assembled circumferentially proximate the inner diameter of the wheel 200.

For clarity purposes, one of the torque bars 222 is removed in FIG. 2, exposing a heat shield retainer 304. Heat shield retainer 304 may secure two ends of heat shield 216 relative to one another. In various embodiments, heat shield 216 may be secured by the torque bars 222 and/or heat shield retainer 304 from radial movement, thereby preventing the heat shield 216 from radial deflection. In various embodiments, heat shield 216 may be secured by the chin ring 220 from radial movement, thereby preventing the heat shield 216 from radial deflection.

In various embodiments, the heat shield retainer 304 assumes the form of a C-clip in cross section (see FIG. 3) having a length in an axial direction A. However, heat shield retainer 304 may assume the form of any suitable geometry in cross section. In various embodiments, the heat shield segment 224 comprises a cylindrically shaped structure 228 comprising an inner surface 308 (or first surface) and an outer surface 310 (or second surface) with respect to a radial direction R. In various embodiments, the heat shield segment 224 extends a circumferential distance 312 and an axial distance 314, respectively, in both a circumferential direction C and the axial direction A. In various embodiments, the axial distance 314 of the heat shield segment 302 may equal the distance between a first axial location (or inboard end) proximate an inboard lip and a second axial location (or outboard end) proximate a wheel disk of a wheel, such as, for example, the inboard lip 204 and the wheel disk 208 of the wheel 200.

In various embodiments, the circumferential distance 312 may span the entire circumference of an inner surface of a wheel, to form a single-segment heat shield, or may span a fraction of the entire circumference, to form a multiple-segment heat shield (e.g., a heat shield assembly including a first heat shield segment and a second heat shield segment and a first heat shield retainer and a second heat shield retainer). In various embodiments, for example, the circumferential distance 312 may equal the distance between adjacent pairs of a plurality of torque bars, thereby forming a multiple-segment heat shield, where the number of heat shield segments equals the number of torque bars. In various embodiments, the number of heat shield segments forming a multiple-segment heat shield may be an integral number, regardless of the number of torque bars.

Figure 3:
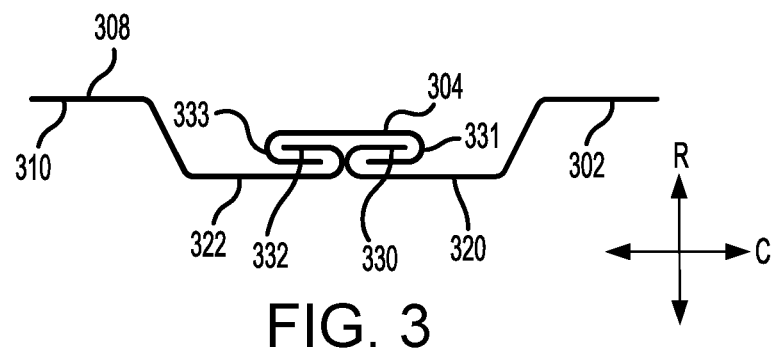
FIG. 3 illustrates a section view of a first heat shield end and a second heat shield end coupled together via a retainer, in accordance with various embodiments.

With reference to FIG. 3, the heat shield segment 302 may include a first end 320 (or first circumferential end) and a second end 322 (or second circumferential end). Heat shield retainer 304 may comprise a high conductivity material, as described herein. In this manner, heat shield retainer 304 may comprise a conduction path between first end 320 and second end 322 to provide circumferential transfer of heat between adjacent ends of a heat shield and/or adjacent heat shield segments. In various embodiments, the first end 320 includes a first hook member 330 and the second end 322 includes a second hook member 332. The first hook member 330 may be configured to engage a first clip member 331 of the heat shield retainer 304 and the second hook member 332 may be configured to engage a second clip member 333 of the heat shield retainer 304. While the first hook member 330 and the second hook member 332, and the first clip member 331 and the second clip member 333, respectively, are each illustrated as having a curved U-shape profile in cross section (e.g., corresponding to the C-clip shape of the heat shield retainer 304 illustrated in FIG. 3), the disclosure contemplates other shapes or profiles, such as, for example, square- or V-shaped cross sectional shapes or profiles. Additionally, in various embodiments, the heat shield segment 302 includes a mount aperture (or several such apertures) that is configured to secure the heat shield to the wheel and/or chin ring using, for example, a screw or bolt or the like extending through the mount aperture and into the wheel.

In various embodiments, the heat shield assembly 300 is assembled by positioning the first end 320 and the second end 322 of the heat shield segment 302 adjacent one another, as illustrated in FIG. 3, and then sliding the heat shield retainer 304 in a direction parallel to the axial direction A, such that the first clip member 331 and the second clip member 333 engage, respectively, the first hook member 330 and the second hook member 332 of the heat shield retainer 304. While the heat shield retainer 304, the first clip member 331 and the second clip member 333, and the first hook member 330 and the second hook member 332, are each illustrated as extending in a direction substantially parallel with the axial direction A, the disclosure contemplates each of the foregoing components may be configured to extend along directions other than parallel to the axial direction A. In various embodiments, for example, each of the foregoing components may be configured to extend at an angle with respect to the axial direction A without loss of generality. In addition, the first clip member 331 and the second clip member 333, and the first hook member 330 and the second hook member 332, may each extend substantially along the entire length of the heat shield segment 302 and the heat shield retainer 304, or the various components may extend along only a portion or a plurality of portions of the respective lengths. Furthermore, in accordance with various embodiments, the first end 320 and the second end 322 of the heat shield segment 302 may be coupled together without the use of a separate retainer. In this manner, the first end 320 and the second end 322 may interlock directly around each other to secure the first end 320 and the second end 322 together.

Figure 6:
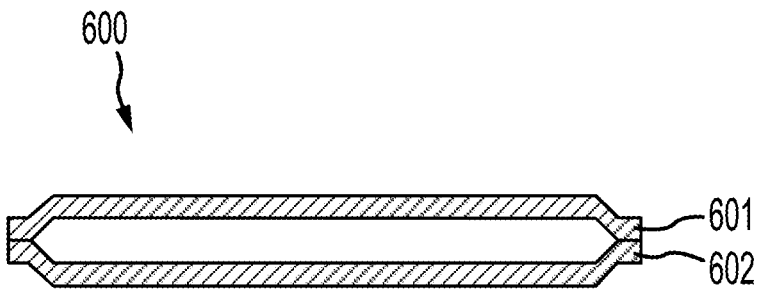
FIG. 6 illustrates a section view of a heat shield comprising a dual-wall construction, in accordance with various embodiments.
Figure 7:
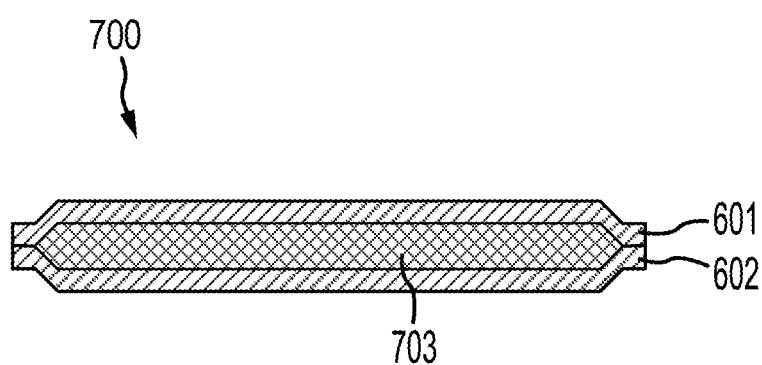
FIG. 7 illustrates a section view of a heat shield comprising a dual-wall construction with an insulating core material, in accordance with various embodiments.

In various embodiments, heat shield segment 302 may be a single layer heat shield or a multi-layer heat shield. An example dual-layer heat shield 600 is illustrated in FIG. 6. With momentary reference to FIG. 6, a dual-layer heat shield 600 may comprise a first layer 601 comprising a high thermal conductivity material, and a second layer 602 comprising the high thermal conductivity material spaced apart from the first layer 601. First layer 601 may be crimped at its edges to second layer 602. In various embodiments, an air pocket may be disposed between the first layer 601 and the second layer 602. In various embodiments, the air pocket may be filled with a core material, such as core material 703 of dual-layer heat shield 700 with momentary reference to FIG. 7. Core material 703 may comprise a ceramic fiber insulation, or the like. First layer 601 may comprise an exposed surface facing radially outwards. Second layer 602 may comprise an exposed surface facing radially inwards. Core material 703 may be sandwiched between the first layer 601 and the second layer 602.

Figure 8:
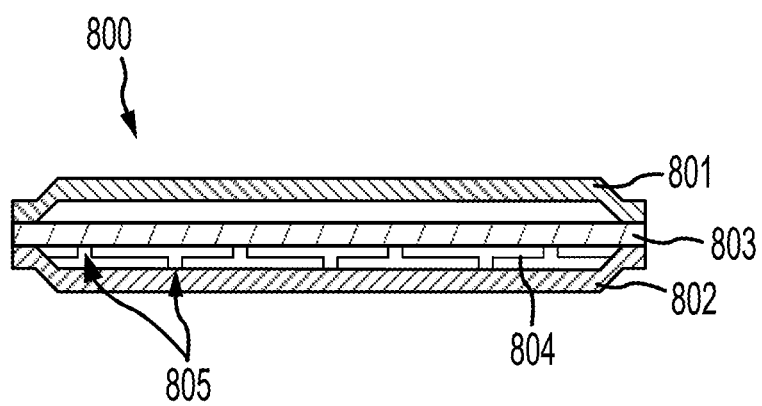
FIG. 8 illustrates a section view of a multi-layer heat shield comprising an outer layer, an inner layer, and a middle layer, in accordance with various embodiments.

With reference to FIG. 8, a section view of a heat shield 800 is illustrated, in accordance with various embodiments. Heat shield 800 may comprise an outer layer 801 (also referred to herein as a first layer), an inner layer 802 (also referred to herein as a second layer), and a middle layer 803 (also referred to herein as a third layer). In various embodiments, the middle layer 803 may be made from aluminum or an aluminum alloy. In various embodiments, the inner layer 802 and/or the outer layer 801 may be made from a high thermal conductivity material, such as aluminized steel for example. However, in various embodiments, the inner layer 802 and/or the outer layer 801 may be made from stainless steel. In this manner, middle layer 803 may comprise a high thermal conductivity such that the middle layer 803 evenly distributes heat along heat shield 800 in all directions (e.g., circumferential and axial directions). In various embodiments, a thin foil layer 804 (also referred to herein as a dimpled foil layer) may be disposed between the inner layer 802 and the middle layer 803. Foil layer 804 may be provided as a radiant heat barrier between the inner layer 802 and the middle layer 803. The foil layer 804 may be dimpled to maintain its position between the inner layer 802 and the middle layer 803. Dimpled foil layer 804 may be configured to mitigate radiative heat from a brake stack from heating middle layer 803 above the melting temperature of the aluminum or aluminum alloy. Dimpled foil layer 804 may be made from a metal material such as stainless steel or aluminized steel, or the like. Dimpled foil layer 804 may comprise a sheet of metal with a plurality of dimples 805 configured to contact inner layer 802 and/or middle layer 803 to maintain proper spacing between inner layer 802, dimpled foil layer 804, and middle layer 803. In various embodiments, outer layer 801, inner layer 802, and middle layer 803 may be crimped together at their edges. In various embodiments, outer layer 801 and middle layer 803 are spaced apart via an air gap (see FIG. 6) and/or via an insulating core material (see FIG. 7).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A wheel assembly, comprising:
   a wheel having a rim and configured to rotate about an axis;
   a torque bar disposed radially inward of the rim;
   a heat shield disposed between the wheel and the torque bar, wherein the heat shield comprises a cylindrical structure extending circumferentially about an axis of the wheel and around an inner diameter of the rim;
   wherein the heat shield comprises a heat shield material, and a thermal conductivity of the heat shield material is greater than 85 W/mK; and
   wherein the cylindrical structure comprises:
      an outer layer;
      an inner layer;
      a middle layer between the outer layer and the inner layer and spaced apart from the outer layer by an air gap;
      a foil layer between the middle layer and the inner layer, the foil layer including dimples to maintain its position between the inner layer and the middle layer; and
   the inner layer defines an external inner diameter surface of the heat shield and the outer layer defines an external outer diameter surface of the heat shield.

2. The wheel assembly of claim 1, wherein the thermal conductivity of the heat shield material is greater than 160 W/mK.

3. The wheel assembly of claim 1, further comprising a heat shield retainer comprising a retainer material, wherein a thermal conductivity of the retainer material is greater than 85 W/mK.

4. The wheel assembly of claim 3, wherein the heat shield comprises a first end and a second end spaced apart from the second end,
   wherein the first end of the heat shield includes a first hook member and the second end of the heat shield includes a second hook member, wherein the heat shield retainer includes a first clip member configured to engage the first hook member and a second clip member configured to engage the second hook member.

5. The wheel assembly of claim 1, further comprising a chin ring comprising a chin ring material, wherein a thermal conductivity of the chin ring material is greater than 85 W/mK.

6. The wheel assembly of claim 1, wherein the heat shield material is evenly distributed throughout the heat shield.

7. The wheel assembly of claim 1, further comprising a brake stack disposed within the heat shield.

8. A heat shield for an aircraft wheel assembly, comprising an outer layer;
   an inner layer spaced apart from the outer layer;
   a middle layer disposed between the outer layer and the inner layer, the middle layer being spaced apart from the outer layer by an air gap, wherein the middle layer is made from at least one of an aluminum or an aluminum alloy; and
   a dimpled foil layer disposed between the middle layer and the inner layer, wherein the dimpled foil layer is configured to provide a radiant heat barrier between the inner layer and the middle layer;
   wherein at least one of the outer layer and the inner layer comprises a heat shield material evenly distributed across the heat shield, wherein a thermal conductivity of the heat shield material is greater than 30 W/mK.

9. The heat shield of claim 8, wherein the thermal conductivity of the heat shield material is greater than 70 W/mK.

10. The heat shield of claim 9, wherein the thermal conductivity of the heat shield material is greater than 85 W/mK.

11. The heat shield of claim 10, wherein the thermal conductivity of the heat shield material is greater than 160 W/mK.

12. The heat shield of claim 8, wherein the dimpled foil layer comprises a first plurality of dimples configured to contact the inner layer and a second plurality of dimples configured to contact the middle layer.

13. The heat shield of claim 8, wherein the dimpled foil layer comprises a first material and the middle layer comprises a second material different from the first material.

* * * * *